United States Patent [19]

Woerner et al.

[11] Patent Number: 4,952,909
[45] Date of Patent: Aug. 28, 1990

[54] EARLY WARNING SYSTEM FOR ANTICIPATED VEHICLE BRAKING

[75] Inventors: Andrew Woerner, Oradell, N.J.; Harold A. Caine, 326 Lena Ave., Freeport, N.Y. 11520

[73] Assignee: Harold A. Caine, Freeport, N.Y.

[21] Appl. No.: 431,994

[22] Filed: Nov. 3, 1989

[51] Int. Cl.⁵ .............................................. B60Q 1/26
[52] U.S. Cl. .................................... 340/464; 340/479
[58] Field of Search ......................... 340/464, 467, 479

[56] References Cited

U.S. PATENT DOCUMENTS

| | | | |
|---|---|---|---|
| 4,663,609 | 5/1987 | Rosario | 340/467 |
| 4,843,368 | 6/1989 | Paulos | 340/464 |
| 4,845,276 | 6/1989 | Abel et al. | 340/467 |

Primary Examiner—Joseph A. Orsino
Assistant Examiner—Frank M. Scutch, III
Attorney, Agent, or Firm—Helfgott & Karas

[57] ABSTRACT

An early warning system for anticipating vehicle braking is provided wherein first and second switches are disposed to monitor a minor depression and substantial depression, respectively, of a vehicle acdelerator. The relative time intervals associated with the first and second switches being in closed and opened conditions are time and compared to predetermined intervals defining instances when early warning activation is appropriate and inappropriate. A running light typically included to operate whenever the brake light is not operating, is controlled to blink as the warning signal indicator.

19 Claims, 2 Drawing Sheets

EARLY WARNING SYSTEM FOR ANTICIPATED VEHICLE BRAKING

BACKGROUND OF THE INVENTION

This invention relates to a light activation apparatus for providing early warning that a braking system is to be activated, and more particularly to early warning light activation apparatus which is highly versatile and can accommodate a plurality of conditions which should result in the early activation of brake lights on a vehicle.

The prevalence of rear end collisions has resulted in the installation of high mounted brake lights on all automobiles manufactured for sale in the United States after 1985. This has been done since it has been demonstrated that placement of brake lights in the following driver's field of view reduces the time between leading vehicle brake light onset and the following vehicle's brake application by approximately 25%. This result is achieved by earlier perception that a braking action is taking place in the leading vehicle.

Avoidance of rear end collisions requires that a driver of a following vehicle maintain an appropriate intervening distance between that vehicle and the leading vehicle. When the leading vehicle executes a braking operation, maintenance of such appropriate intervening distance by the following vehicle requires that the driver thereof have time to perceive the braking condition, respond thereto and finally to decelerate. The mounting of a brake light directly in the field of view of the following driver enables earlier perception and, accordingly, where all things are otherwise equal, an earlier response and the onset of an earlier deceleration to maintain the requisite intervening distance.

Further improvement in the following driver's ability to perceive a braking condition occurring in a leading vehicle are available if the activation apparatus for the brake light within the braking system of a vehicle provides a signal of anticipated stopping prior to an actual depression of a brake pedal thereby anticipating the operator actions. Thus such telegraphing of an about to occur braking condition effectively removes the time interval between when the driver of a leading vehicle's foot is removed from the accelerator and actually impacts the braking pedal. While such an interval is typically measured in tenths of a second the extension in the period of time for the driver of a following vehicle to perceive a braking condition and respond thereto provides a significant increase in safety.

The significant safety aspects of such an early warning system have been recognized by the prior art. See for example, U.S. Pat. No. 4,788,572 as issued to M. Eckstein and A. Shapira on Nov. 29, 1988. This form of early warning brake light activation system provides an early turn on of the brake light upon release of the accelerator when braking occurs under emergency conditions and the vehicle operator otherwise performs in a predetermined, standardized manner. However, the vehicle brake light activating devices disclosed cannot readily accommodate and distinguish many normal and sometimes varied operator activities which either should or should not result in an early illumination of the brake lights prior to an actual impacting of the brake pedal by an operator. Such activities may include, for example, the pumping of an accelerator pedal when a vehicle is started, a slow release of the accelerator pedal past a point to accommodate slowing down for traffic and which is not followed by actuation of the brake pedal. Other examples may be seen to occur when the accelerator is released after an interval which is simply too short to ensure that the vehicle has acquired appropriate velocity for braking or operator driving irregularities which may give the impression from the early warning system that the operator is constantly hitting the brake pedal without any purpose and hence cause the brake light to be ignored by a following driver.

Therefore it is a principal object of the present invention to provide an improved early warning system which provides an indication of anticipated emergency braking of a vehicle.

A further object of this invention is to provide an early warning light activation system wherein time intervals associated with accelerator position are determined for purposes of indicating whether said system should be activated.

An additional object of the present invention is to provide early warning system wherein time intervals associated with accelerator position are compared with predetermined intervals to determine whether said early warning system should be activated, such predetermined intervals may be pre-set or stored electronically from previous driver reactions.

Various other objects and advantages of the present invention shall become clear from the following detailed description of an exemplary embodiment thereof and the novel features will be particularly point out in conjunction with the claims appended hereto.

SUMMARY OF THE INVENTION

In accordance with the teachings of the present invention an early warning system for anticipating vehicle braking is provided, wherein first and second switch means are disposed to respectively monitor a minor depression and substantial depression of a vehicle accelerator; the relative time intervals associated with said first and second switch means being engaged are timed and compared to predetermined intervals defining instances when warning is appropriate or inappropriate; and an activation occurs in accordance therewith.

BRIEF DESCRIPTION OF THE DRAWING

The invention will be more clearly understood by reference to the following detailed description of an exemplary embodiment thereof in connection with the accompanying drawings in which.

DETAILED DESCRIPTION OF THE PREFERRED EMBODIMENTS

Figure 1:
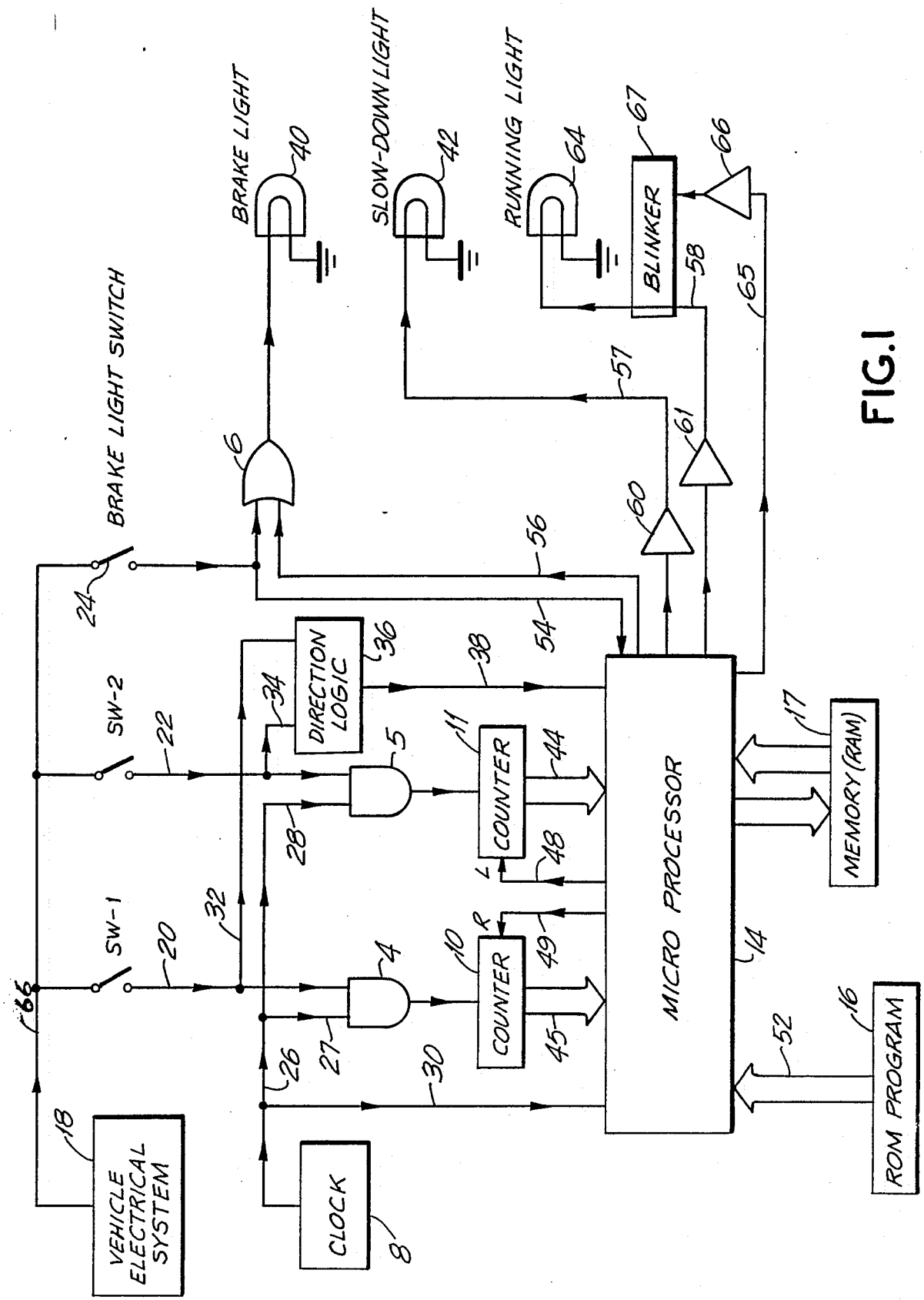
FIG. 1 is a block diagram schematically illustrating a preferred embodiment of the present invention utilizing a microprocessor.

Referring now to FIG. 1, there is shown a block diagram serving to schematically illustrate a preferred embodiment of early warning system according to the present invention. The embodiment illustrated in the drawing is depicted within a conventional vehicle electrical environment and comprises first and second switch means SW-1 and SW-2, gate means 4–6, clock means 8, first and second counter means 10 and 11, a microprocessor 14 and a read only memory 16, and random access memory 17.

The first and second switch means SW-1 and SW-2 may take the conventional form of simple contact closures implemented through microswitches, optical switches or the like which are normally biased to an open or closed condition and are actuated upon the depression of a vehicle accelerator pedal either by actual mechanical placement in connection with the accelerator pedal mechanism or its linkage. The first switch means SW-1 is arranged to be actuated when the pedal is only slightly depressed as when the vehicle is moving very slowly or idled at a slightly advanced rate due to lightly imposed pressure on the accelerator. The second switch means SW-2 is disposed in relation to the accelerator pedal, its mechanism or its linkage, so as to be closed when the accelerator pedal has been depressed far enough so that the vehicle acquires a substantial forward velocity; however, this location, as will be appreciated by those of ordinary skill in the art, is variable at the option of the designer.

The first and second switch means SW-1 and SW-2 are connected as shown to the vehicle electrical system (indicated generally by the block 18) which provides appropriate voltage thereto. In addition, switch means SW-1 is connected through the conductor 20 to one input of gate means 4 while the second input of the switch means SW-2 is connected through the conductor 22 to a corresponding input of the gate means 5. In addition, a brake light switch 24 of the type conventionally employed in vehicles to actuate a brake light as a result of a depression of the brake pedal is also connected to the vehicle electrical system 18 in the manner illustrated.

The gate means 4 and 5 as indicated in the figure may take the conventional form of AND gates which act in the well known manner to produce a high at the output thereof, connected respectively to the counters 10 and 11, when both of the inputs thereto are high. While AND gates have been illustrated for the gate means 4 and 5 complementary logic configurations could be used as well. The second input to each of the gate means 4 and 5 is connected through conductors 26-28 to the clock means 8.

The clock means 8 may take any of the well known forms of this conventional class of device which acts to output a predetermined pulse at a fixed repetition rate. For example, a crystal oscillator chip whose output is divided down to the selected clock frequency may be employed. Here, by way of example, an appropriate frequency of 1 Megahertz may be utilized. Additionally, as shown, the output of the clock is connected through the conductor 30 to the microprocessor 14. Here again, as will also be recognized by those of ordinary skill in the art, should it be desired to provide the counters 10 and 11 with a different clocking rate than the microprocessor 14, additional divider stages may be interposed between the clock output connected to the conductor 30 and that connected to the conductor 27 and 28.

As thus connected, those of ordinary skill in the art will appreciate that each of the AND gates 4 and 5 will produce an output which is connected respectively to the counters 10 and 11 that corresponds to the clock rate supplied to the conductors 27 and 28 whenever the switch connected to the remaining input thereto is closed. Thus, when switch SW-1 is closed indicating that the accelerator is in a slightly closed position, the counter 10 will receive pulses to be counted at a rate supplied to the conductor 27. Conversely whenever the switch SW-2 is closed, the counter 11 will receive clock pulses from AND gate 5 at the rate supplied through the conductor 28. The switch inputs on conductors 20 and 22 are also connected through conductors 32 and 34 to the direction logic indicated by the block 36. The direction logic may take any of the conventional forms of this well known class of device and acts in the usual manner to provide an output indicative of whether the switch SW-1 or SW-2 was closed and/or opened first. As such, the direction logic indicated by the block 36 may be implemented with separate charging or sample and hold circuits associated with each of the conductors 32 and 34 and a comparator circuit therefor or alternatively, an up-down counter configuration which would also require a clock input (not shown) may be employed. The output of the directional logic is supplied through the conductor 38 to the microprocessor 14.

The counter means 10 and 11 may take any of the conventional forms of this well known class of device. For example, two 4040 binary counters as available from RCA Company may be employed. Each of the counters 10 and 11 receive and count high frequency clock pulses provided by the clock means 8 through the AND gates 4 and 5 when the respective switches SW-1 and SW-2 are closed indicating a depression of the accelerator pedal at a slightly depressed condition as indicated by the switch SW-1 or a substantially depressed condition as indicated by the switch SW-2. Each of the counter means 10 and 11 is capable of counting to a level of approximately 16 million for purposes of timing an interval of approximately 25 milliseconds. As such, those of ordinary skill in the art will appreciate that separate intervals associated with closures of each of switches SW-1 and SW-2 may be counted by each of the counters 10 and 11, respectively, and the difference in the state of the counts therein will indicate for example the time interval between when the switch SW-2 has been opened and the switch SW-1 is opened.

This serves to readily distinguish conditions wherein an operator has substantially depressed the accelerator pedal closing both switches SW-1 and SW-2 and thereafter causes the switches SW-2 and SW-1 to open at different times. For example, in an emergency condition where the operator removes his foot from the accelerator pedal rapidly to place that foot on the brake, the opening of SW-2 will be promptly followed by the opening of Sw-1. Here the state of the counter 10 will indicate only a slightly greater count than the state of the counter 11 since such a maneuver is typically completed in a very short interval.

However, where an operator slowly releases pressure from the accelerator to allow the torque of the engine to slow the vehicle, the opening of switch SW-2 will be followed by a much greater interval by the opening of switch SW-1, if at all. Furthermore, actuation of the early warning signal should be avoided unless the operator actually decides to brake. Here, however, actuation of an optional slow-down light 42 would be appropriate.

Thus those of ordinary skill in the art will appreciate that when the direction of the accelerator pedal is upward as indicated by the direction logic 36, the transit time of the accelerator between the positions monitored by switches SW-2 and SW-1 will be indicated by the difference between the state of the count in the counters 11 and 12. Conversely, when the accelerator pedal is descending the difference in time indicated by the counters 10 and 11 will represent the transit time of the accelerator pedal between the positions monitored by switches SW-1 and SW-2.

The state of the counters 10 and 11 indicate the length of time which the switch SW-1 or SW-2 associated therewith has been in a closed condition. Accordingly unless a certain minimum value is exhibited by at least the counter 11, the accelerator pedal has not been depressed for a sufficient interval to indicate that an emergency braking condition warranting an early warning of anticipated braking is appropriate. This results because unless counter 11 has at least a certain minimum value, the accelerator pedal may not have been depressed long enough for the vehicle to have acquired any substantial velocity on normal straight road conditions. Instead, short intervals of closure of switch means SW-2 may well indicate that the operator is pumping the accelerator pedal attending a starting operation or the like.

The output of each of the counters 10 and 11 is supplied through the multi-conductor cables 44 and 45 to the microprocessor 14 which monitors the state of the count of each counter directly. In addition, a pair of counter reset lines 48 and 49 are supplied from the microprocessor 14 to each of the counters 10 and 11 for purposes of resetting the same. Resetting of the counters, occurs under microprocessor control once both switch means SW-1 and SW-2 have opened and the microprocessor is no longer energizing an early warning light or slow down light 42.

The microprocessor 14 may take any of the conventional forms of this well known class of device. The microprocessor 14 need only exhibit relatively low power capability and hence a 4 bit device for example, a 6085 microprocessor as available from RCA Company may be utilized. The microprocessor 14 is connected through the multi-conductor cable 52 to a conventional ROM 16 which contains a standard operating program for the system from RAM 17. In addition a plurality of time constants or fixed present numbers are stored in ROM 16. These present numbers are employed by the microprocessor 14 to compare with the output of counters 10 and 11 to determine appropriate dwell time, i.e., how long the switch SW-2 has been closed to ensure a pedal pumping operation is not taking place, transition time for the accelerator pedal between the positions associated with switches SW-2 and SW-1 and any other limitations or factors required to be preset and compared with measured values to enable a decision to be generated concerning an output signal. The program ROM 16 may take any of the conventional forms of read only memory, EPROM or EEPROM devices well known to those of ordinary skill in the art.

In addition to the inputs and outputs already noted above the microprocessor receives an input on conductor 54 indicative that the brake light switch 24 has been closed and provides outputs on conductors 56–58. The output on the conductor 56 is supplied through the gate means 6 which here takes the conventional form of an OR gate. The OR gate 6 acts to actuate the brake light 40 whenever either of the inputs thereto go high. Thus the microprocessor 14 may actuate the brake light 40 to provide an early warning that a braking condition is anticipated before the same is actually initiated by the operator's depression of the brake pedal by placing a high on conductor 56. Alternatively, the closure of the brake light switch 24 indicating that the brake pedal has been depressed will result in OR gate 6 actuating the brake light 40. The input to the microprocessor 14 on conductor 54 indicates that the brake light switch 24 has been closed and will normally cause microprocessor 14 to release line 56 after a short delay to ensure a continuum of the brake light condition indicated by a high on conductor 56. Conversely, should conductor 54 not go high within a predetermined interval after the microprocessor 14 enables a high on conductor 56, the high in conductor 56 will be extinguished since the operator did not actually depress the brake and hence the early warning brake light condition indicated under these circumstances was erroneous.

As there may be legal impediments against having the brake light activated from a source other than depression of the brake pedal, the output from the microprocessor could be directed to control other early warning systems in anticipation of a braking condition. As is shown, the microprocessor 14 also has outputs connected through conventional drivers 60 and 61 to the conductors 57 and 58. As indicated the conductor 57 is conducted to Slow-Down light 42 while the conductor 58 is connected to the Running Light 64. The Running Light is actuated by microprocessor 14 by the provision of an output on the conductor 58 whenever both the switches SW-1 and SW-2 are closed so that the counters 10 and 11 are providing an output to the microprocessor 14 and neither the brake light 40 nor the slow down light 42 are actuated. Both the slowdown light 42 and the running light 64 can be mounted in a bank in the vicinity of a vehicle's rear window to provide extensive information in the following vehicles field of view are specifically noted.

In a preferred embodiment, rather than have the microprocessor control early turning on of the brake light, the use of the running light and a blinking arrangement controlling the running light would be utilized. Specifically, under normal conditions, the running light 64 would be operated at all times when the brake light is not illuminated. Typically, the running light would be a yellow or amber light that would be placed next to the center high mounted brake light. Such a yellow running light is described in U.S. Pat. No. 4,808,968 issued to Harold A. Caine on Feb. 28, 1989. In the present system, the microprocessor 14 sends out the early warning signal on line 65 to the conventional driver 66 which controls a conventional blinker circuit 67. Accordingly, the existing yellow or amber running light will begin to blink upon conditions indicating an anticipated braking action. This blinking yellow light will provide an early awareness to the trailing driver to anticipate a braking action. When the driver then depresses the brake pedal, the actual brake light will go on and the yellow blinking light will be extinguished so as not to interfere with the brake light.

It should also be noted that the various outputs of the microprocessor 14 on conductors 56, 57, 58 and 65 may be selectively shaped to facilitate use thereof within the instant embodiment of the present invention. Thus, for example, an early warning brake light signal on conductor 56 may be stretched or output for a period which exceeds the normal period required for an operator to hit a brake so that the brake light 40 will continuously be illuminated until such time as the brake light switch 24 is closed. This extension interval, however, must be relatively short since once the brake light is actuated by the microprocessor 14 the same should be promptly followed by an indication on conductor 54 that the brake light switch 24 has been closed by or through the action of an operator depressing the brake. If this does not occur it is apparent that the actuation of the early warning condition for brake light 40 is improper and the same should be extinguished by the microprocessor 14. However, by simply stretching the output in conductor 56, the input on conductor 54 may be avoided if desired.

In operation, the instant embodiment of the present invention shall be described as if the slow down light 42 and blinking running light 64 options are present. Those of ordinary skill in the art will appreciate, however, that other types of warning arrangements could be utilized.

When the vehicle is started or staring, the vehicle electrical system 18 will be actuated supplying an appropriate voltage level to the conductor 66. Should the brake be actuated, a closing of the brake switch 24 will occur and result in the application of a high level, associated with the voltage on conductor 66, and will be communicated through closed switch 24 to one input of OR gate 6 to cause illumination of the brake light 40. This condition will also be signaled to the microprocessor through the input thereto connected to conductor 54.

Alternatively, if in starting the vehicle the operator rapidly pumps the accelerator, as is typically done for carburetor vehicles in cold weather, switch SW-1 and SW-2 will be rapidly closed and opened or alternatively switch SW-2 will be rapidly opened and closed and perhaps switch SW-1 held in a closed position. In either event the state of the counter 11 provided through the multi-conductor cable 44 to the microprocessor 14 when the direction logic 36 signals that the pedal is traversing in an upward direction will not be substantially different than the value previously input by the counter 11 when the direction logic indicated the accelerator pedal was being depressed. Furthermore the value of the counter input on multiconductor 44 of the state of the count prior to the opening of the switch SW-2 will be relatively small when compared to the fixed value stored in the read only memory 16. Thus, when the microprocessor 14 acts to compare the value of the prior period of depression of the accelerator to the position associated with switch SW-2 against the fixed value stored in read only memory 16, no output will be provided on the conductor 56 to cause the illumination of a warning signal since clearly a pumping operation is involved.

Conversely, if during normal highway operation where the switches SW-1 and SW-2 have been closed for a substantial period, an emergency condition results in an operator's withdrawal of his foot from the accelerator to the brake, a different sequence of events will occur. Here, a substantial count will have already been registered by the counter 11 and supplied to the microprocessor 14 so that the condition associated with the fixed interval of depression imposed by the constant value stored in ROM 16 will have been met. Thereafter, upon withdrawal of the operator's foot the direction logic 36 will signal a change in direction and the count present in counter 11 will promptly stop being incremented. This will be shortly followed by the same action in counter 10. Microprocessor 14 in comparing the counts on conductors 44 and 45 will determine that the time interval therebetween is quite short and will thereafter actuate an early warning signal by application of a high output level on conductor 65 which will cause the running light to blink. If this is promptly followed by a closure of the brake light switch 24 this condition will be indicated to the microprocessor 14 by a confirming input on conductor 54. Immediately, so as to prevent both lights from being illuminated, the blinking running light will turn off.

However, should the signal 54 indicating that the brake has been actuated not occur within a fixed interval of time as stored in the read only memory 16, the microprocessor will terminate the signal on conductor 65 since clearly the early brake warning signal originally output on conductor 65 was in error. Under these conditions microprocessor 14 will output a signal on conductor 57 to illuminate the slow down light 42 since when both of the switches SW-1 and SW-2 are open the operator is clearly employing removal of the foot from the accelerator to slow the vehicle. Should the slow-down light not be included, then as the blinking stops, the steady running light will again persist. It should be understood that anytime the brake light 40 or the slow-down light 42 are illuminated, the running light 64 will be extinguished and conversely anytime the brake light 40 and/or the slow-down light 42 are extinguished, the running light 64 will be illuminated.

Further conditions appropriate for actuation of the slow-down light 42 but inappropriate for actuation of the blinking of the running light 64 occur when an operator is operating a vehicle on the highway or the like and releases the accelerator slowly to slow the vehicle. This will cause only the switch SW-2 to open or both the SW-2 and SW-1 switches to open under conditions where the time interval between such openings, as signaled by the state of the counts of the respective counters 11 and 10, is substantial when compared to the interval of movement of the accelerator which occurs when a foot is promptly removed. Here, the time interval indicated by the counters 10 and 11 would be compared to the time interval or emergency stop preset stored in read only memory 16 and an insufficient comparison would be obtained. Under these circumstances the slow-down light would again be illuminated. The blinking running light 64, however, would not be illuminated.

While the instant invention has been disclosed in connection with a rather specific embodiment thereof it will be apparent to those of ordinary skill in the art that many of the teachings herein and the apparatus described may be readily varied to suit specific design preferences or operating situations and will be varied as a function of user habits. For instance, a single counter in position of counter 11 may be utilized and an on-off switch substituted for counter 10 or the switch SW-1 may be employed for this purpose. In addition, various types of logic illustrated herein may be varied to suit costing factors or design preferences and obviously complimentary logic to that set forth may be employed. In addition, the early warning system disclosed herein may be incorporated as part of additional vehicle monitoring or control apparatus which is microprocessor driven or controlled wherein that microprocessor is employed to control the instant system.

In actual operation of a vehicle, there are many factors that must be incorporated in making a determination of anticipated braking. While along a straight road, there may be some relationship between depression of the accelerator and velocity, this will not be the case in going up or down an incline. Likewise, at high speeds this relationship may no longer be identical as at slow speeds. Furthermore, individual driving habits must be taken into consideration. Some drivers will continuously pump and release the accelerator while others will use a steady depression. Using the system of the present invention, however, the equipment may be tailored to various conditions and various driving habits. Through the use of the microprocessor, the adjustable timing counters, and establishing precondition values in the ROM program, accommodation can be made for different drivers, different driving conditions, and different automobile reactions.

Additionally, through the use of heuristic programming techniques, the system can be made to "learn" how a particular driver operates his accelerator pedal prior to depressing the brake. The time delays used by the driver under actual conditions can be stored in a memory within the microprocessor and then used for decision making instead of fixed predetermined values. The device can then be personalized for each driver automatically. This would be a significant improvement in eliminating false warnings and bring a closer approximation to try and read the driver's mind and anticipate when he will provide for an emergency stop.

Although the use of the microprocessor and previous circuitry described would be preferred, other methods of implementing the electrical circuitry could be achieved. By way of example, and with reference to FIG. 2, there is again shown the two switches, SW-1 and SW-2 connected respectively to the low and high positions of depression of the accelerator pedal. The output of switch 2 passes through a variable delay set to provide a delay of between 100 and 1200 microseconds. The output of the closure of SW-2 also passes through an inverter 82 and the two outputs pass through AND gate 84. This output then passes through a second variable delay 86 again set at the same time delay.

The output from variable delay 86 together with the closure of SW-1 both feed AND gate 88 whose output again passes through a third variable delay 90 providing a delay of between 200 microseconds and 4 secs. The result is sent through AND gate 92 together with an adjustable clock rate from adjustable clock 94. The output from AND gate 92 on line 96 is then utilized to control the blinking of the yellow or amber daytime running light.

Figure 2:
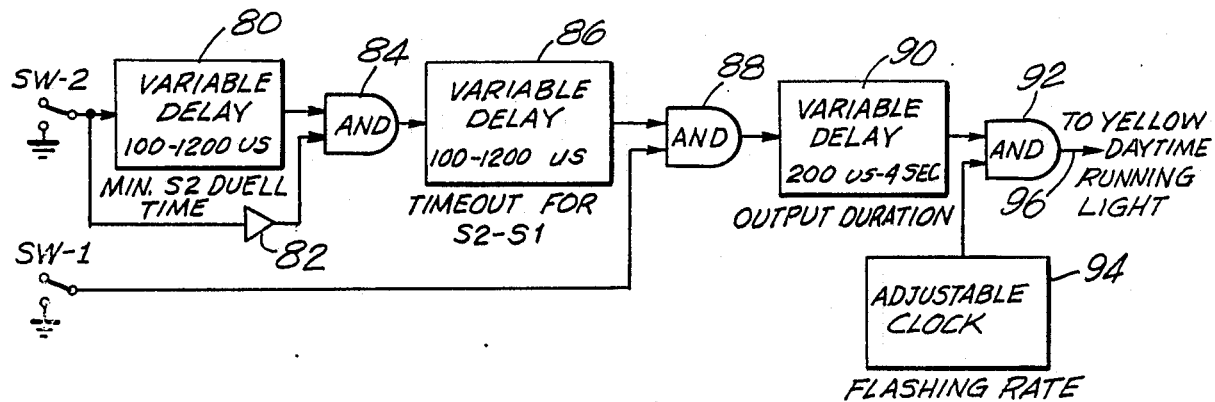
FIG. 2 is another block diagram schematically illustrating the use of circuit elements without the use of a microprocessor.

With the system shown in FIG. 2, variable delay 80 provides a minimum dwell time for SW-2. Variable delay 86 provides the time out for the difference between closure of SW-2 and SW-1. Variable delay 90 provides for the output duration and the adjustable clock 94 provides for the flashing rate of the yellow blinking light.

With the system shown, emergency lift-off of the foot from the accelerator pedal will produce a signal causing the yellow or amber running light to blink giving an early warning of anticipated emergency braking.

Figure 3:
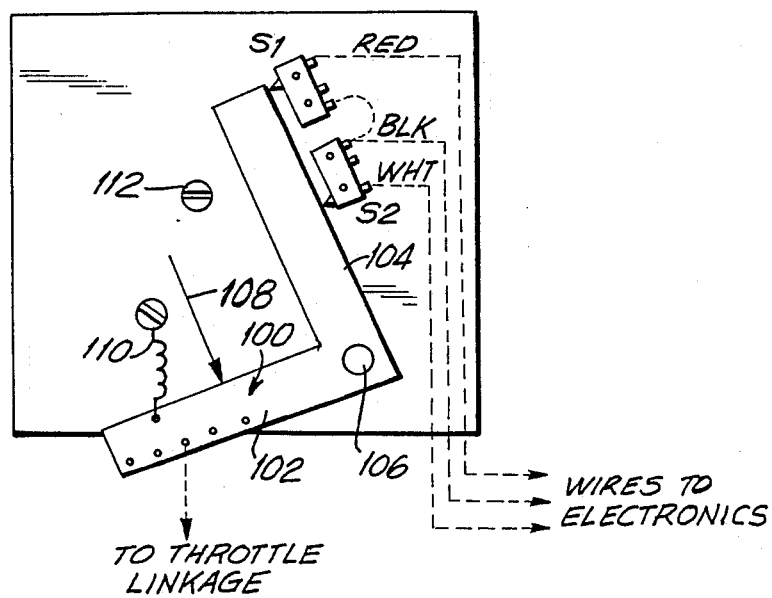
FIG. 3 is a drawing of a switch assembly which can be coupled to the accelerator linkage in implementing the physical interconnection to a vehicle.

The particular switches SW-1 and SW-2 can be connected structurally to the automobile in numerous ways. By way of a embodiment, reference is had to FIG. 3 which schematically shows a switch assembly for use on a vehicle to implement the previously described system. Specifically, there is shown a movable arm 100 in the form of an L, having a first arm 102 and a second arm 104 pivoted about a central pivot 106. The bar can be connected at numerous locations. By way of example, it can be connected under the accelerator pedal inside the vehicle, up against the fire wall, or other locations. In this manner, upon depression of the accelerator, the arm 102 will be depressed downwardly as shown by the arrow 108. A return spring 110 is provided to return the movable arm to its initial position after the accelerator is released. A stop 112 can be provided to limit maximum movement of the arm 104. Two switches, S1 and S2 are respectively provided spaced from each other adjacent the end position of the arm 104. The switches can be of any type such as microswitches, photodiodes, or the like. In the present embodiment, the switches are microswitches of the single pole, double throat type and are normally closed. Thus, when depression occurs the switches will open and when release occurs, the switches close.

It will be noted, that when the accelerator is depressed, S1 will be actuated first. Upon further depression of the accelerator pedal, switch S2 will be activated. The reverse will occur upon release of the accelerator pedal. The timing between actuation of S1 and S2 is determined as the function of the emergency stopping. The switches S1 and S2 can be spaced as desired. However, preferably they are close together in order to eliminate excessive accelerator play. The leads from switches S1 and S2 are led out to the necessary electronics to control the lights as heretofore described.

Accordingly although the instant invention has been described in connection with a highly specific exemplary embodiment thereof, it will be understood that many modifications and variations thereof will readily be apparent to those of ordinary skill in the art. Therefore, it is manifestly intended that this invention be only limited by the claims and the equivalents thereof.

What is claimed is;

1. An early warning system for anticipated braking, comprising:
   means for energizing a warning signal;
   first switch means disposed to assume a first state upon slight activation of a vehicle accelerator and a second state upon a release of said accelerator;
   second switch means disposed to assume one state upon a condition of substantial activation of an accelerator and another state upon a release of said condition of substantial activation;
   means coupled to said first and second switch means for determining a time interval between when said second switch means goes from said one state to said another state and first switch means goes from said first state to said second state; and
   means for comparing said time interval to a reference interval and enabling said means for energizing said warning signal when said time interval has a predetermined relationship to said reference interval.

2. The early warning system according to claim 1, wherein said means for determining additionally detects a period during which said second switch means is in said one state and said means for comparing acts to inhibit an enabling of said means for energizing if said period is less than a selected value.

3. The early warning system according to claim 1, additionally comprising slow-down light warning indicia and means for energizing said slow down light warning indicia when said means for comparing indicates said time interval does not have said predetermined relationship to said reference interval.

4. The early warning system according to claim 1, additionally comprising means for indicating direction of accelerator displacement toward and away from increased activation, said means for indicating being connected to at least said second switch means.

5. The early warning system according to claim 1, wherein said means for comparing takes the form of microprocessor means.

6. The early warning system according to claim 1, wherein said means for determining takes the form of first and second counters, said first counter means being connected to sense the state of said first switch means and said second counter means being connected to sense the state of said second switch means.

7. The early warning system according to claim 6, additionally comprising first and second gate means, said first gate means being interposed between said first switch means and said first counter means and said second gate means being interposed between said second switch means and said second counter means, and clock means connected to each of said first and second gate means, said first gate means applying clock pulses to be counted from said clock means to said first counter means when said first switch means is in said first state and said second gate means applying clock pulses to be counted from said clock means to said second counter means when said second switch means is in said one state.

8. The early warning system according to claim 7, wherein said means for comparing takes the form of microprocessor means for receiving an output from each of said first and second counter means indicative of the state of the count thereof and for providing an enabling output to said means for energizing said warning signal.

9. The early warning system according to claim 8, wherein said second counter detects a period during which said second switch means is in said one state and said microprocessor means does not enable said means for energizing if said period is less than a selected value.

10. The early warning system according to claim 9, additionally comprising means for indicating direction of accelerator displacement toward and away from increased activation, said means for indicating being connected to said first and second switch means and said microprocessor means.

11. The early warning system according to claim 9, wherein said means for energizing a warning signal comprises gating means, said gating means having first and second inputs and an output connected to a brake light, one input of said gating means being connected to said microprocessor means and another input of said gating means being connected for activation by a brake light switch.

12. The early warning system according to claim 11, wherein said another input of said gating means is connected as an input to said microprocessor means; said microprocessor means acting subsequent to an enabling of said means for energizing to disable said means for energizing if an input is not timely received from said another input of said gating means.

13. The early warning system according to claim 9, additionally comprising slow down light warning indicia connected to said microprocessor means, said microprocessor means additionally acting to energize said slow-down light warning indicia when said time interval does not have said predetermined relationship to said reference interval.

14. The early warning system according to claim 1, additionally comprising running light indicia connected to operate whenever a brake light is not operated, and a blinking system coupled between said energizing means and running light indicia to energize said running light indicia whenever said timer interval has a predetermined relationship to said reference interval.

15. The early warning system according to claim 14, wherein said brake light and said running light indicia are arranged for display proximate a back window of a vehicle.

16. The early warning system according to claim 1, additionally comprising means for indicting direction of accelerator displacement toward and away from increased activation, said means for indicating being connected to said means for energizing.

17. The early warning system according to claim 1, wherein said reference interval includes parameters obtained by prior drivers.

18. The early warning system according to claim 1, wherein said reference interval includes fixed, predetermined values.

19. The early warning system according to claim 1, wherein said reference interval includes values determined from prior operation of the vehicle by the driver.

* * * * *